March 22, 1966
W. M. COONS, JR  3,241,186
APPARATUS FOR EXTRUDING MOLECULARLY ORIENTED
PIPE OF THERMOPLASTIC RESIN
Filed Sept. 30, 1963
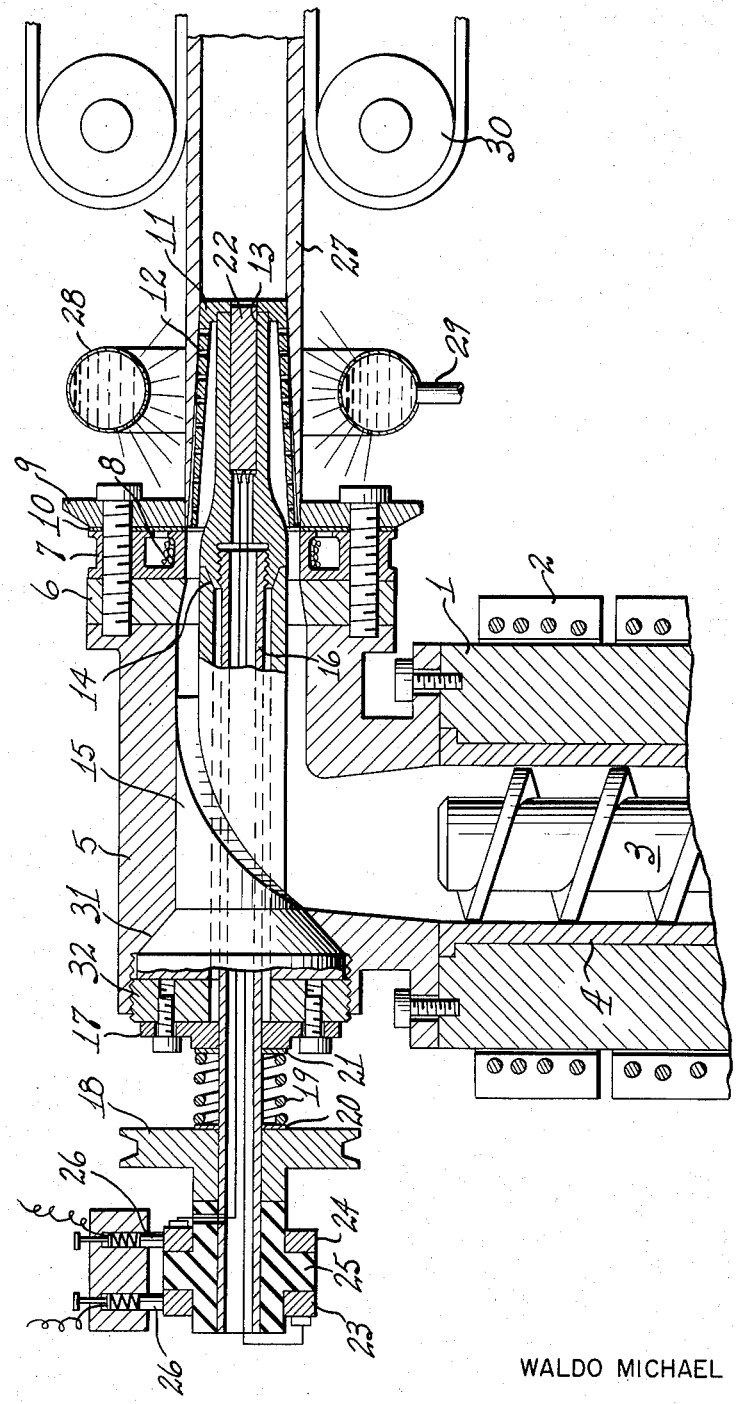
INVENTOR
WALDO MICHAEL COONS, JR.
BY
ATTORNEY ＃ 3,241,186
APPARATUS FOR EXTRUDING MOLECULARLY ORIENTED PIPE OF THERMOPLASTIC RESIN
Waldo Michael Coons, Jr., Wilmington, Del., assignor to E. I. du Pont de Nemours and Company, Wilmington, Del., a corporation of Delaware
Filed Sept. 30, 1963, Ser. No. 312,451
3 Claims. (Cl. 18—14)

This invention relates to an apparatus for the direct extrusion of molecularly oriented thermoplastic pipe.

Prior art methods of producing molecularly oriented thermoplastic pipe generally commence with a preformed pipe of smaller dimensions than that of the desired product and thereafter produce molecular orientation by extension processes such as hydraulic expansion, rolling, or the like. The principal change produced by such orientation has been to increase the tensile strength of the thermoplastic in the direction of elongation. In the case of pipe, it is generally desirable to strengthen the hoop direction selectively, since the stress in a pressurized pipe is greater in the hoop than in the circumferential direction.

The products made by the apparatus of the present invention are molecularly oriented substantially in a circumferential direction according to X-ray analysis, but depending on the polymeric substance employed may differ from products produced by prior art orientation processes. Thus, in the case of polyoxymethylene resins i.e., acetal resins, a more ductile rather than a stronger product is produced. On the other hand, in the case of isotactic polypropylene substantial strengthening in the hoop direction, similar to that obtained with prior art orientation processes is found. The reasons for the difference in properties of products made by the novel apparatus of the present invention is not wholly understood.

It is an object of the present invention to form molecularly oriented thermoplastic pipe directly from molten thermoplastic resin.

This, and other objects, which will become apparent hereinafter, is achieved by a process whereby a solid skin defining one surface of the pipe is formed, and thereafter molten thermoplastic is extruded about the surface of the pipe in successive increments, the thermoplastic polymer being cooled to the solid state while being sheared in a circumferential direction about the axis of the pipe. This process may be accomplished in a continuous manner by an apparatus comprising an annular die and a rotating hollow conical mandrel, rotating on the axis of the die, the conical mandrel being located so that its rearward and wider end is within the die, which is adapted to be cooled, the conical mandrel extending beyond the die to a closed end, and having a plurality of perforations over its conical surface.

In operation, the head assembly described above is attached to an extruder and molten thermoplastic polymer is extruded through the assembly. A part of the thermoplastic polymer flows between the mandrel and the interior of the die and is cooled to form a skin defining the outer surface of the pipe, the remainder of the molten thermoplastic flows through the interior of the mandrel and outwardly through the perforations. The pipe is withdrawn from this assembly and cooled from the exterior at a rate adjusted so that the freeze line of the plastic closely follows the contour of the conical surface of the mandrel which thus subjects the molten thermoplastic to a high circumferential shear in the region between the surface of the mandrel and the solid polymer.

The successful production of melt oriented plastic pipe depends on shearing the melt during the process of solidification i.e., maintaining a thin layer of melt between the solid pipe and the rotating mandrel. The thickness of the melt layer cannot be determined directly with accuracy, but has been estimated to be of the order of 5 to 20 mils. The occurence of suitable shearing conditions is indicated by the magnitude of the torque in the extruded pipe which increases as the freeze line approaches the rotating mandrel then sharply increases as the polymer commences to freeze in the mandrel. The degree of torque which may be present is determined in part by the pipe, thicker walled pipe being able to accept a greater degree of torque without failing by buckling. Accordingly, this invention is applicable to the production of self-supporting pipe i.e., pipe having a wall thickness of at least about 50 mils and is not applicable to the manufacture of thin walled tubular structures such as tubular thermoplastic film.

This invention will be better understood by a description of a specific apparatus which is illustrated partly in section in the accompanying drawing.

Referring to the aforesaid drawing, the molten thermoplastic is supplied to the extrusion head by a conventional extruder, the forward end of which is shown in the figure. The barrel of the extruder is shown by 1, surrounded by electrical heater bands 2 to provide heat, as desired, to assist the melting operation which is largely performed by the mechanical work supplied by the extrusion screw 3. The extruder barrel is supplied with a hardened, replaceable, polished liner 4 which resists the chemical and abrasive action of the polymer.

Bolted to the extruder head is crosshead body 5 adapted to support the die and mandrel assembly.

The die consists of an adaptor plate 6 which provides a smooth transistion between the internal diameter of the crosshead face and the desired die diameter, a heated section 7, which may conveniently have a hollow machined in its outer face, close to the interior surface in contact with the molten thermoplastic, adapted to receive the windings of an electrical resistance heater 8. The face of the die is a metal plate 9 which is thermally insulated from the heated die section 8 by a non-conducting washer 10 which is made of glass fibers mixed with polytetrafluoroethylene resin. This arrangement provides a smooth interior face to the two sections, yet substantially thermally isolates the cooled outer section 9 from the heated inner section 7. The sections 6, 7, and 9 and the washer 10 are bolted to the face of the crosshead body 5 by machine bolts passing through holes in the respective segments, and thus providing for minor adjustments to the concentricity of the various sections.

The mandrel is made in two sections which are bolted to each other, the outer substantially conical section 11 is made of hard brass machined to dimensions and perforated with a large number of holes about 0.1 inch in diameter. The inner part of the mandrel 13 is conveniently made of aluminum bronze. The inner part 13 is rigidly attached to the outer portion of the mandrel 12 at the forward end. Rearwardly, the mandrel flares to a conical bearing 14 which seats on a mating steel support 15, and contoured to direct the polymer flow about the mandrel, the rearward part of the support 15 being a close fit in the body of the crosshead body 5, the extreme rear being terminated by a conical surface 31. The support 15 is locked into the body 5 by a threaded ring 32. The use of aluminum bronze for inner part 13 of the mandrel thus provides a non-seizing bearing 14 against the steel supporting member 15. A hollow shaft 16 is screwed into the inner mandrel section 13 and passes through the tubular support 15, then the crosshead body 5 and a bearing 17 bolted to the rear of the ring 32. A pulley adapted to receive a V belt 18 is rigidly affixed to the hollow shaft 16. A heavy coil spring 19 is located about shaft 15 between the pulley 18 and the bearing 17 together with two washers 20 and 21. The spring 19 is slightly compressed before tightening pulley 18 on the shaft 16 to provide compression on the conical bearing 14 between the supporting tube 15 and the inner section of the mandrel 13, to prevent polymer melt leaking into the space between 15 and 13 and to maintain alignment of mandrel 13.

The inner mandrel 13 is bored to receive a cartridge heater 22, which is particularly useful for heating the mandrel during the starting operation. The leads from this heater pass through the hollow drive shaft 16 to the conducting rings 23, 24 which are mounted on a plastic body 25 affixed to the rearward end of shaft 16 to act as a commutator. Spring loaded conductive graphite brushes 26 make a rubbing contact with the conductive elements thereby providing electrical contact to wire leads which lead to a variable voltage source equipped with suitable metering (not shown).

The mandrel is rotated by a V belt passing over pulley 18 and leading to a variable speed gear box, the output of which is equipped with a similar pulley over which the V belt passes, and the input of which is connected to an electric motor. This drive system, which is conventional in the art, has been omitted from the diagram.

The plastic pipe 27 emerging from the metal plate 9 is cooled by a fluid spray from a hollow ring 28 which is supplied with a fluid, preferably a liquid such as water, through an inlet 29 which emerges through perforations about the inner part of the ring to spray the face of the metal plate 9 and the section of the pipe passing over the hollow mandrel with the cooling fluid. Conventional take-off equipment 30, withdraws the pipe from the die at a controlled rate.

In starting the operation, granules of the thermoplastic resins are supplied to the hopper of the extruder which is preheated by the heater bands. Heat is supplied to the hot section of the die 7 by heater 8 and to the mandrel by the cartridge heater 22. Additional heat may be supplied by applying a flame or the like to the conical portion of the mandrel. The extruder is then started, together with the mandrel drive. As molten thermoplastic starts to emerge from the annular gap between the mandrel and the die, and through the holes in the mandrel, a starting tube, held in the take off, is driven backwards into the die. The starting tube consists of a pipe of the same thermoplastic, having the same dimensions as the product, and having the inner surface, at the end adjacent to the extruder, machined to substantially mate with the tapered end of the mandrel. At this point the cooling water is started and the cartridge heater 22 turned down or off. The take-off is then started slowly in a forward direction. Take-off speed is then slowly increased until the pipe commences to bind on the mandrel, as indicated by a marked increase in tendency to twist, then cut back slightly to permit operation without pipe rotating in the take-off jaws or collapsing.

The rate of extrusion is determined by the geometry of the hollow mandrel, and by the rate of cooling, the greatest rate of extrusion being achieved with the least angle of taper at a given cooling rate. Using a conventional water-spray cooling system, practical rates of extrusion may be achieved with cone angles of from ½° to 5° measured as the angle between the conical face and the axis of the mandrel.

The thickness of the skin defining the outer surface of the pipe is substantially determined by the clearance between the mandrel and the inner face of the annular die. This is not critical but should generally be less than ⅕ the wall thickness of the product pipe. The speed of rotation of the head is likewise by no means critical, and it is believed that the greater shearing action achieved at higher rotational speeds is offset by greater generation of heat and hence relaxation of the molecules to an unoriented condition. Speeds may suitably be from about 20 to about 100 r.p.m.

It will be realized that the process may be practiced with other machines which differ substantially from that described herein. Thus, short lengths of oriented pipe may be made by taking a tubular, water-cooled, cylindrical former adapted to rotate about its axis, placing this substantially in contact with an elongated slit die, such as is used for the production of extruded sheet, and extruding molten thermoplastic polymer on the cylinder while rotating the cylinder to shear the molten polymer between the die face and the cylinder, and at a speed of rotation sufficiently great to prevent complete solidification of the deposited thermoplastic during a single revolution of the cylinder. The cylinder is then slowly withdrawn from the die to permit successive increments to be deposited until the product obtains the desired thickness.

With respect to the apparatus for continuous extrusion, it will be realized that many modifications may be made thereto without departing from the spirit of this invention. Thus, the extrusion head of this invention may be mounted directly on the head of the extruder barrel and the mandrel coupled to the extruder screw which thereby supplies the means for rotating. Alternatively a hollow extruder screw may be employed and the mandrel driven by a shaft passing through the screw at a speed independent of the screw speed.

Many other modifications of the apparatus of this invention will be apparent to those skilled in the art.

This invention is further illustrated by the following examples which are intended merely to illustrate this discovery and the products that may be obtained thereby, and should not be construed as limiting the scope thereof.

*Example 1*

An apparatus substantially as shown in the drawing appended hereto and described in the foregoing specification was built on a 2" Royle extruder. The internal diameter of the annular die was 2.435". The external diameter of the rearward (wide) end of the hollow perforated mandrel was 2.395" tapering to 2.305" diameter over a length of 3.17". Commercial isotactic polypropylene was extruded with this apparatus using an extruder speed of 15 r.p.m. and a mandrel speed of 25 r.p.m. at a rate of 6" per minute. Samples cut from this pipe were analysed by X-rays and shown to be highly oriented in circumferential direction. Samples cut from the walls of the pipe were also tested with an "Instron" tensile tester. The tensile strength in the longitudinal (axial) direction of the pipe was 4,400 p.s.i. (average) substantially equal to that of a pipe extruded by prior art processes from the same polypropylene resin and substantially unoriented. The tensile strength in the hoop direction was 6,500 p.s.i. The hoop creep of the pipe was measured by cutting strips about the circumference and subjecting them to a constant stress of 2000 p.s.i. while recording the elongation. For the oriented pipe made by the process of this invention the sample elongated 3.5% in 1000 hrs., by contrast a similar sample cut from the control extruded by prior art processes elongated 9% in the same test period.

*Example 2*

Using the apparatus described in Example 1, a sample of a commercial polyoxymethylene (acetal) resin pigmented with Monastral Blue Pigment, was extruded at a rate of 4" per minute using a mandrel speed of 40 r.p.m. Samples of the pipe showed that the product was highly molecularly oriented in the hoop or circumferential direction of this pipe as determined by X-rays. Surprisingly the tensile strength in the hoop direction was substantially equal to that of unoriented extruded pipe produced from the same polymer, but the elongation and ductility was markedly increased, samples cut from the new product could be repeatedly flexed 180° in the hoop direction without breaking whereas break occurred before the sample was bent 180° once in the longitudinal direction. A sample of the oriented pipe was hydraulically expanded at a temperature of about 140° C. to a deformation of 1.2x in the longitudinal direction and 1.65x in the hoop or circumferential direction. The yield strength of this product was 15,100 p.s.i. in the hoop direction and 10,100 p.s.i. in the longitudinal direction. Attempts to hydraulically expand extruded, unoriented pipe made from the same resin were unsuccessful, the pipe breaking before any substantial expansion had occurred.

I claim:

1. An extrusion head for the extrusion of molecularly oriented thermoplastic pipe comprising a circular die, means to cool the said die, a hollow conical mandrel axially disposed to said die, said mandrel having an open and widest end located within the said die and protruding beyond the said die to a closed and narrow end, said mandrel having a plurality of perforations dispersed over the conical surface of the mandrel in communication with the interior thereof, means cooperatively associated with the mandrel to rotate the said mandrel about the axis thereof, said die and said mandrel being constructed and arranged such that when molten thermoplastic is forced through said extrusion head a minor part of the said molten thermoplastic flows outside said mandrel to form a skin defining the outer surface of said pipe and a major part of the said molten thermoplastic flows outwardly through the perforations of the said hollow mandrel.

2. Apparatus of claim 1 wherein the said die comprises a first section forming the face of said die and a second section in mechanical contact with but substantially thermally isolated from the said first section, heating means to heat said second section and cooling means to cool said first section.

3. Apparatus of claim 1 in which the said mandrel has a cone angle between about ½° and 5°.

References Cited by the Examiner
UNITED STATES PATENTS

| | | | |
|---|---|---|---|
| 2,926,384 | 3/1960 | Hertz et al. | 18—14 |
| 3,010,155 | 11/1961 | Gilmore | 18—30 |
| 3,050,779 | 8/1962 | Farley | 18—30 |
| 3,070,840 | 1/1963 | Mercer | 18—12 |
| 3,074,108 | 1/1963 | Wiley et al. | 18—14 |
| 3,097,058 | 7/1963 | Branscum et al. | |
| 3,103,409 | 9/1963 | Bohres et al. | |

J. SPENCER OVERHOLSER, *Primary Examiner.*

ALEXANDER H. BRODMERKEL, ROBERT F. WHITE, *Examiners.*